United States Patent
Smith et al.

(12) United States Patent (10) Patent No.: US 6,976,143 B2
(45) Date of Patent: Dec. 13, 2005

(54) SYSTEMS AND METHODS FOR CONTROLLING COMMUNICATION WITH NONVOLATILE MEMORY DEVICES

(75) Inventors: Kenneth K. Smith, Boise, ID (US);
Stewart R. Wyatt, Boise, ID (US);
Stephen Morley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 10/008,101

(22) Filed: Nov. 13, 2001

(65) Prior Publication Data

US 2003/0093642 A1     May 15, 2003

(51) Int. Cl.[7] .............................................. G06F 12/00
(52) U.S. Cl. ...................... 711/170; 710/104; 710/8; 713/1
(58) Field of Search ........................................ 711/170

(56) References Cited

U.S. PATENT DOCUMENTS

| | | | |
|---|---|---|---|
| 5,752,066 A | 5/1998 | Bealkowski et al. | 395/800.1 |
| 6,081,447 A | 6/2000 | Lofgren et al. | 365/185.02 |
| 6,172,906 B1 | 1/2001 | Estakhri et al. | 365/185.11 |
| 6,202,138 B1 | 3/2001 | Estakhri et al. | 711/168 |
| 6,532,526 B2 * | 3/2003 | Nizar et al. | 711/170 |
| 6,665,743 B2 * | 12/2003 | Benhase et al. | 710/10 |

* cited by examiner

*Primary Examiner*—Mano Padmanabhan
*Assistant Examiner*—Midys Rojas (57) ABSTRACT

Systems and methods for controlling communication with nonvolatile memory devices via a memory bus are provided. Briefly described, one of many possible embodiments is a system comprising a memory controller in communication with a memory bus, the memory controller configured to control communication with at least one nonvolatile memory device by configuring the at least one nonvolatile memory device, via the memory bus, with a unique device identifier.

22 Claims, 7 Drawing Sheets

SYSTEMS AND METHODS FOR CONTROLLING COMMUNICATION WITH NONVOLATILE MEMORY DEVICES

TECHNICAL FIELD

The present invention is generally related to computer memory devices and, more specifically, to systems and methods for controlling communication with nonvolatile memory devices.

BACKGROUND OF THE INVENTION

Memory controllers are commonly used in a variety of types of computing devices to control how information is accessed from multiple nonvolatile memory devices located within the computing device. In order to communicate with nonvolatile memory devices, existing memory controllers typically employ both a shared bus and a plurality of control lines. Existing memory controllers use the shared bus for transmitting data, address, and control communications to the nonvolatile memory devices connected to the shared bus. Existing memory controllers typically also include multiple pins, or "Chip Selects (CS)," which connect to the control lines. Each control line connects to one of the nonvolatile memory devices. Thus, in order to communicate with a particular nonvolatile memory device, the memory controller typically transmits the data, address, and/or control information on the shared bus, while also enabling the Chip Select corresponding to the target nonvolatile memory device.

Existing memory controllers for controlling nonvolatile memory devices typically suffer from several disadvantages. For instance, existing memory controllers may only support serial communication with the nonvolatile memory devices, which provides slow access to the information contained on the nonvolatile memory devices. In order to receive information from two nonvolatile memory devices, the memory controller first enables the Chip Select for the first device and then transmit an appropriate command on the shared bus and wait for a response to be received via the shared bus. Then, the memory controller may enable the Chip Select for the second device and transmit the command on the shared bus and wait for a response. Obviously, this serial communication scheme may be slow and may be problematic.

Furthermore, existing memory controllers cannot expand beyond the total number of Chip Selects as defined and implemented during the design process. In other words, the number of Chip Selects on a memory controller determines the maximum number of nonvolatile memory devices with which the memory controller may communicate. Thus, the cost of existing memory controllers increases depending on the maximum number of nonvolatile memory devices with which the memory controller is designed to communicate. This tradeoff between expandability and cost may be very problematic in manufacturing memory controllers for nonvolatile memory devices.

SUMMARY OF THE INVENTION

The present invention provides systems and methods for controlling communication with nonvolatile memory devices.

Briefly described, one embodiment is a system for controlling communication with nonvolatile memory devices via a memory bus. The system may comprise a memory controller in communication with a memory bus. The memory controller may be configured to control communication with at least one nonvolatile memory device by configuring the nonvolatile memory devices, via the memory bus, with a unique device identifier.

The present invention may also be viewed as a nonvolatile memory device adapted for communication with a memory controller via a memory bus. Briefly described, the nonvolatile memory device may comprise a local interface, an input connection, and logic. The local interface may be configured for communication with the memory bus. The input connection, which is in communication with the local interface, may be configured to receive an enable configuration command. The logic may be configured to receive a device configuration command containing a unique device identifier via the memory bus and to determine when the input connection receives an enable configuration command. The logic may be further configured to store the unique device identifier when the input connection receives an enable configuration command.

The present invention may also be viewed as a method for controlling communication with nonvolatile memory devices via a memory bus. Briefly, one such method comprises the steps of: configuring each of the plurality of nonvolatile memory devices with a corresponding unique device identifier; and exchanging communication with the plurality of nonvolatile memory devices using a predefined protocol based on the unique device identifiers.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

I. Overview

Figure 1:
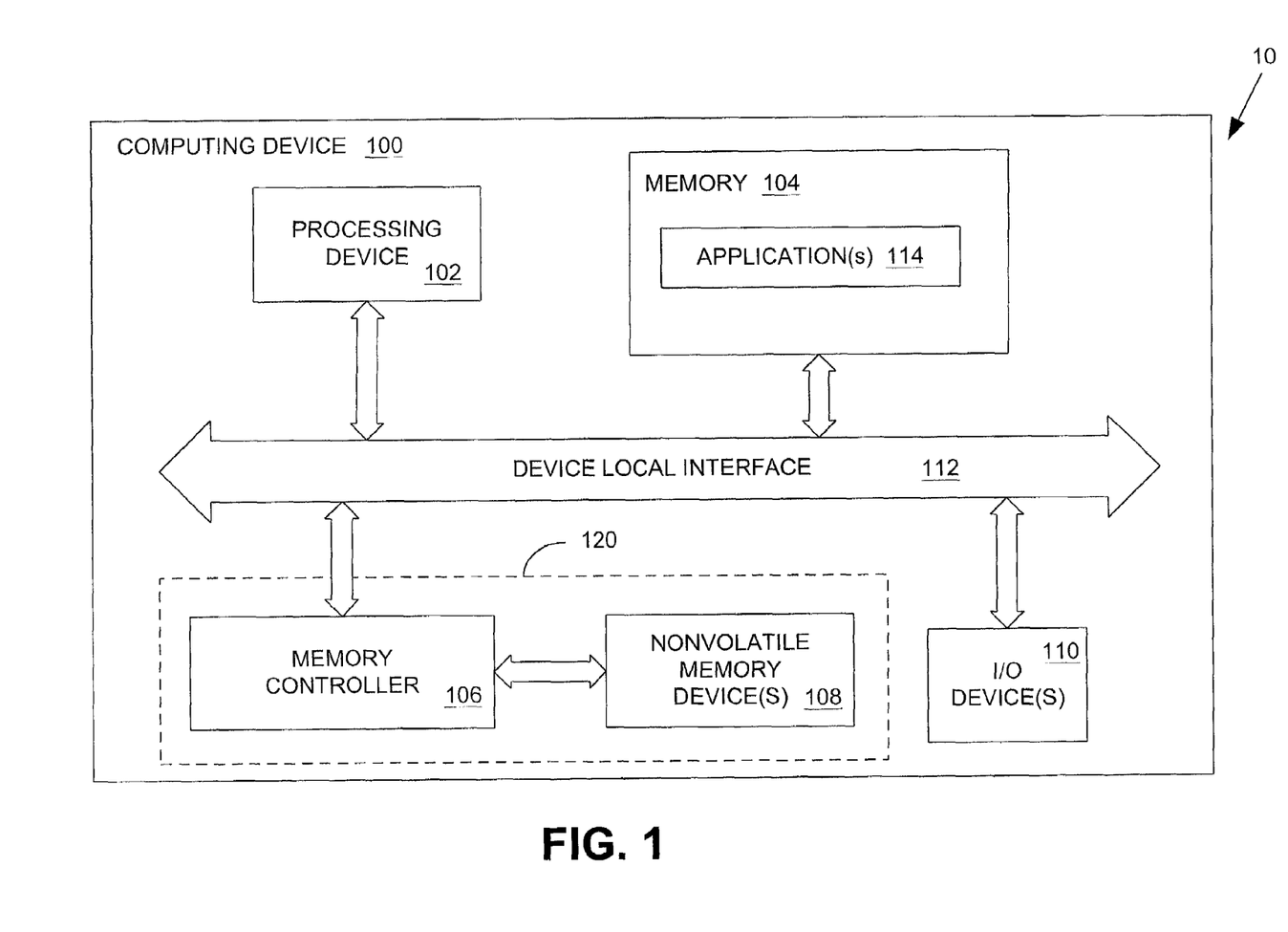
FIG. 1 is a schematic diagram illustrating a computing device implementing one possible embodiment of a system of the present invention for controlling communication with one or more nonvolatile memory devices.

FIG. 1 illustrates a system 10 of the present invention that includes a representative computing device 100 implementing a system 120 for controlling communication with a plurality of nonvolatile memory devices 108. For ease of description, system 10 will be described as including only one computing device 100 and an associated system 120, although various other numbers of computing devices 100 and/or systems 120 may be used. As will be described in detail below, system 120 enables a memory controller 106 to communicate with a plurality of nonvolatile memory devices 108 via a memory bus 200 using unique device identifiers and without separate control connections to each device. System 120, therefore, provides a memory controller 106 that is not dependent on the number of nonvolatile memory devices 108 to be controlled. Thus, system 120 enables communication between a standard memory controller 106 and a potentially unlimited number of nonvolatile memory devices 108 via memory bus 120.

As described in more detail below with respect to FIG. 2, at least some of the nonvolatile memory devices 108 are linked in a chain by connecting an output connection 204 of a first nonvolatile memory device 108 to the input connection 202 of a second nonvolatile memory device 108, and so on. The memory controller 106 and the chain of nonvolatile memory devices 108 are in communication via memory bus 200. Memory controller 106 configures the nonvolatile memory devices 108 with a unique device identifier by sending device configuration commands via memory bus 200. When a nonvolatile memory device 108 receives an enable configuration command on input connection 202 from a previous device in the chain, the nonvolatile memory device 108 may be configured with the unique device identifier. Then, an enable configuration command may be provided on output connection 204 to the next nonvolatile memory device 108 in the chain. During this process, the memory controller 106 may be configured to provide unique device configuration commands on memory bus 200. In this manner, the memory controller 106 may configure each of the nonvolatile memory devices 108 with a unique device identifier. After the nonvolatile memory devices 108 are configured, memory controller 106 may communicate with each of the nonvolatile memory devices 108 in the chain using the unique device identifier.

Referring to FIG. 1, computing device 100 may comprise a processing device 102, memory 104, memory controller 106, and one or more input/output devices 110 interconnected via device local interface 112. Computing device 100 may also comprise a plurality of nonvolatile memory devices 108 in communication with, and controlled by, memory controller 106. Memory 104 may comprise one or more user applications 114.

One of ordinary skill in the art will appreciate that computing device 100 may be configured to provide any of a number of applications 114. Accordingly, computing device 100 may further comprise any of a number of other components not illustrated in FIG. 1. For example, computing device 100 may be a personal computer, a laptop computer, a handheld computer, a personal digital assistant (PDA), a digital camera, an audio player and/or recorder configured to play and/or record audio or video content, such as an MP3 player, a wireless telephone, a low-power device, or any other device in which it is advantageous to control communication with a plurality of nonvolatile memory devices. Therefore, depending on the particular configuration, computing device 100 may further comprise any of the following or other components: one or more user interface devices, one or more network interface devices, disk drives, or other I/O devices 110, such as speakers, to name a few.

Furthermore, applications 114 and other functionality provided by computing device 100 may be implemented in hardware, software, firmware, or a combination thereof. As illustrated in FIG. 1, in one of a number of possible embodiments, the applications 114 and other functionality may be implemented in software or firmware that is stored in memory 104 and executed by processing device 102 or any other suitable instruction execution system. Depending on the particular configuration and/or complexity of computing device 100, memory 104 may further comprise a suitable operating system. If implemented in hardware, as in alternative embodiments, applications 114 and other functionality may be implemented with any or a combination of the following technologies: a discrete logic circuit(s) having logic gates for implementing logic functions upon data signals, an application specific integrated circuit (ASIC) having appropriate combinational logic gates, a gate array (s), such as, a field programmable gate array (FPGA), etc.

Local interface 112 may be, for example but not limited to, one or more buses or other wired or wireless connections, as known in the art. Local interface 112 may comprise additional elements, which are omitted for simplicity, such as controllers, buffers (caches), drivers, repeaters, and receivers, to enable communications. Further, local interface 112 may include address, control, and/or data connections to enable appropriate communications among processing device 102, memory 104, memory controller 106, I/O devices 110, and any other devices connected to local interface 112.

Memory 104 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 104 may incorporate electronic, magnetic, optical, and/or other types of storage media. Memory 104 may also have a distributed architecture, where various components are situated remote from one another, but may be accessed by the processing device 102.

Processing device 102 may be a hardware device for executing software located in memory 104. Processing device 102 may be any custom made or commercially available processor, a central processing unit (CPU), a semiconductor based microprocessor (in the form of a microchip or chip set), a macroprocessor, or generally any device for executing software instructions.

II. System for Controlling Communication with Nonvolatile Memory Devices

Figure 2:
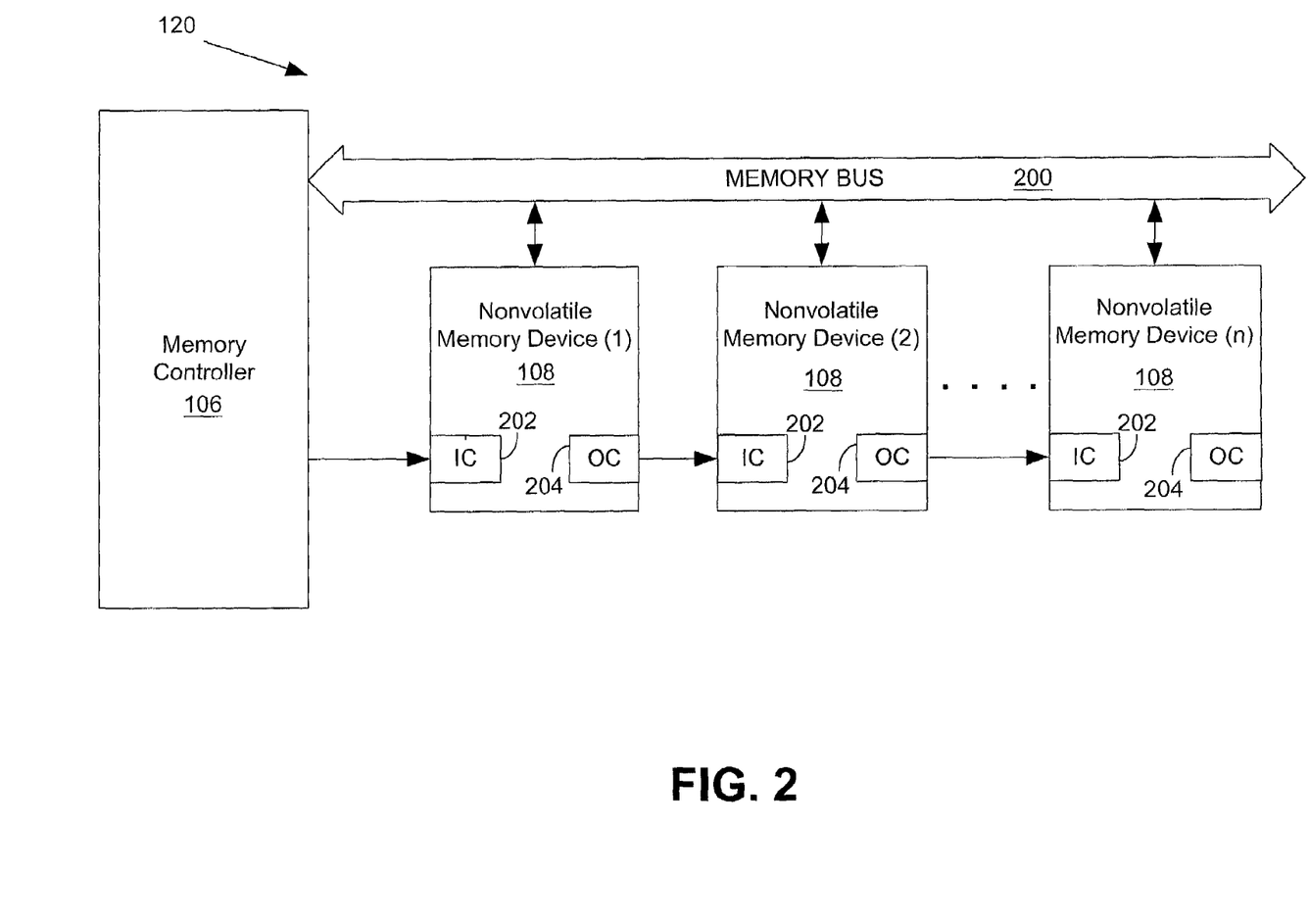
FIG. 2 is a more detailed schematic diagram illustrating the system of FIG. 1.

Referring to FIGS. 2–7, the architecture, operation, and functionality of system 120 for controlling communication with one or more nonvolatile memory devices 108 will be described. FIG. 2 is a schematic diagram illustrating one of a number of possible embodiments of system 120 according to the present invention. System 120 may comprise a memory controller 106 and one or more nonvolatile memory devices 108 that communicate with each other via memory bus 200. As illustrated in FIG. 2 and described in more detail below, system 120 enables memory controller 106 to communicate with the nonvolatile memory devices 108 without separate control connections to each device. Thus, the configuration of memory controller 106 is not dependent on the number of nonvolatile memory devices 108 to be controlled. System 120, therefore, provides communication between a standard memory controller 106 and a potentially unlimited number of nonvolatile memory devices 108 via memory bus 200.

Communications between memory controller 106 and the nonvolatile memory devices 108 occurs via memory bus 200. Memory bus 200 may be, for example but not limited to, one or more buses or other wired or wireless connections. One of ordinary skill in the art will appreciate that memory bus 200 may include address, control, and/or data connections to enable appropriate communications between memory controller 106 and the nonvolatile memory devices 108.

Nonvolatile memory devices 108 may be any form of solid state memory, including, but not limited to, floating gate nonvolatile memory, magnetic nonvolatile memory, flash memory, programmable read-only memory, erasable programmable read-only memory, electrically erasable programmable read-only memory, and flash memory, to name a few. Although not required, computing device 100 and nonvolatile memory devices 108 may be configured so that nonvolatile memory devices 108 may be easily inserted within and removed from computing device 100. One of ordinary skill in the art will appreciate that it may be advantageous to enable a user to operate computing device 100 to access a variety of types of data on a number of nonvolatile memory devices 108. In this manner, the user may easily insert and remove the nonvolatile memory devices 108 to access specific data. For example, computing device 100 may be an audio player, such as an MP3 player, and nonvolatile memory devices 108 may contain music to be accessed by the MP3 player. Therefore, a user may easily listen to the music stored on a number of nonvolatile memory devices 108 by inserting and removing the nonvolatile memory devices 108.

Memory controller 106 may comprise a hardware device for executing software located in a memory. Memory controller 106 may be any custom made or commercially available processor, a central processing unit (CPU), a semiconductor based microprocessor (in the form of a microchip or chip set), a macroprocessor, or generally any device for executing software instructions. Memory controller 106 may also be implemented with any or a combination of the following technologies: a state-machine, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), programmable logic device (PLD), etc.

As illustrated in FIG. 2, each of the plurality of nonvolatile memory devices 108 may include an input connection 202 and an output connection 204. The input connection 202 is adapted to receive an enable configuration command and the output connection 204 is configured to provide an enable configuration command. As described in more detail below, the enable configuration command may comprise any signal that, when received by the nonvolatile memory device 108, enables the nonvolatile memory device 108 to be configured with a unique device identifier contained in a device configuration command received from memory controller 106 via memory bus 200. For example, the enable configuration command may be a logical command or any other type of command.

As further illustrated in FIG. 2, at least some of the nonvolatile memory devices 108 are linked together in a chain such that the output connection 204 of a first nonvolatile memory device 108 is connected to the input connection 202 of a second nonvolatile memory device 108, and so on. One of ordinary skill in the art will appreciate that the input connection 202 of the first nonvolatile memory device 108 need not be connected to another nonvolatile memory device 108. For example, the input connection 202 of the first nonvolatile memory device 108 may be connected to memory controller 106, in which case memory controller 106 controls when the input connection 202 receives the enable configuration command. Alternatively, the input connection 202 of the first nonvolatile memory device 108 may be controlled by a device other than the memory controller 106. Furthermore, the output connection 204 of the last nonvolatile memory device 108 in the chain need not be connected to another nonvolatile memory device 108. Alternatively, the output connection 204 of the last nonvolatile memory device 108 in the chain may or may not be connected to the memory controller 106.

Figure 3:
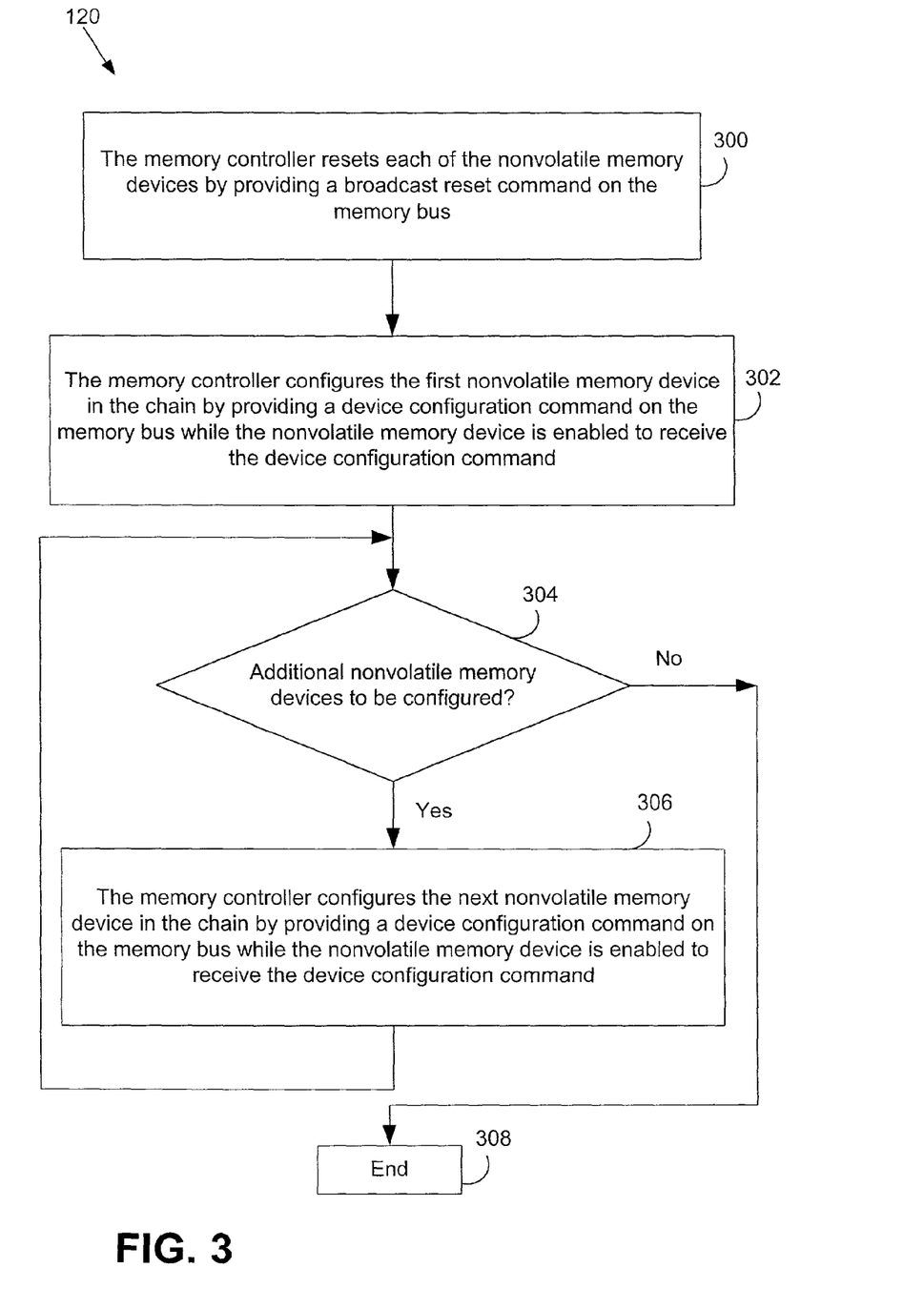
FIG. 3 is a flowchart illustrating the general operation of the system of FIG. 1.

FIG. 3 is a flowchart illustrating the general operation of an embodiment of system 120, including the interoperation of a memory controller and nonvolatile memory devices. System 120 enables the memory controller to communicate with nonvolatile memory devices based on unique device identifiers associated with each of the nonvolatile memory devices. In order to communicate based on the unique device identifiers, the memory controller configures each of the nonvolatile memory devices with a unique device identifier. At block 300, the memory controller resets each of the nonvolatile memory devices by providing a broadcast reset command on the memory bus. The broadcast reset command and the nonvolatile memory devices may be adapted such that, when the reset command is received by each nonvolatile memory device, a unique device identifier is reset. For example, the nonvolatile memory devices may include a portion of memory designated for storing the unique device identifier. When the reset command is received via the memory bus, the nonvolatile memory device resets the unique device identifier.

At block 302, the memory controller configures the first nonvolatile memory device in the chain by providing a device configuration command containing a unique device identifier on the memory bus. The memory controller may preferably provide the command while the nonvolatile memory device is enabled to receive the device configuration command. As described above, the nonvolatile memory device may be enabled to receive the device configuration command when an enable configuration command is received on the input connection. When an enable configuration command is received on the input connection, the nonvolatile memory device stores the unique device identifier contained in the configuration command. After the nonvolatile memory device stores the unique device identifier, an enable configuration command is provided via the output connection to the next nonvolatile memory device in the chain.

Each nonvolatile memory device may be adapted with logic for monitoring a configured state that determines whether the nonvolatile memory device has been configured by the memory controller with a unique device identifier. When the nonvolatile memory device has not been configured by the memory controller, the configured state is not enabled. After the nonvolatile memory device has been configured with the unique device identifier, the configured state is enabled. Thus, if the nonvolatile memory device receives an enable configuration command while the configured state is enabled, the nonvolatile memory device will not be configured with another unique device identifier. Rather, the nonvolatile memory device may preferably provide the enable configuration command on output connection 204 to the next nonvolatile memory device in the chain.

As shown in decision block 304, if there are additional nonvolatile memory devices in the chain, the process is repeated for the next nonvolatile memory device in the chain at block 306. One of ordinary skill in the art will appreciate that there are a number of ways for the memory controller to determine if there are additional nonvolatile memory devices in the chain. For example, in one embodiment, the memory controller may include a configuration done input, which may be connected to the output connection 204 of the last nonvolatile memory device in the chain. In operation, the memory controller may determine that the last nonvolatile memory device has been configured when the enable configuration command (or any other command) is received from the last nonvolatile memory device on the configuration done input.

In alternative embodiments, the memory controller may be adapted to configure a predetermined maximum number of nonvolatile memory devices. For instance, in operation, the memory controller may cycle through the configuration process the predefined maximum number of times regardless of the number of nonvolatile memory devices in system 120. The memory controller may then verify how many nonvolatile memory devices are actually in system 120 by sending a message on memory bus 200 for each unique device identifier. Each nonvolatile memory device in system 120 may then send an acknowledgement message to the memory controller, thereby enabling the memory controller to determine which unique device identifiers are active. When the final nonvolatile memory device in the chain is configured with a unique device identifier, the configuration may terminate at block 308.

Furthermore, one of ordinary skill in the art will appreciate that the process of providing device configuration commands containing unique device identifiers by the memory controller and the process of receiving and providing enable configuration commands by nonvolatile memory devices should preferably be timed. For example, system 120 may be timed such that the memory controller provides a unique device configuration command via the memory bus while the input connection of each successive nonvolatile memory device in the chain receives an enable configuration command.

III. Memory Controller

Figure 4:
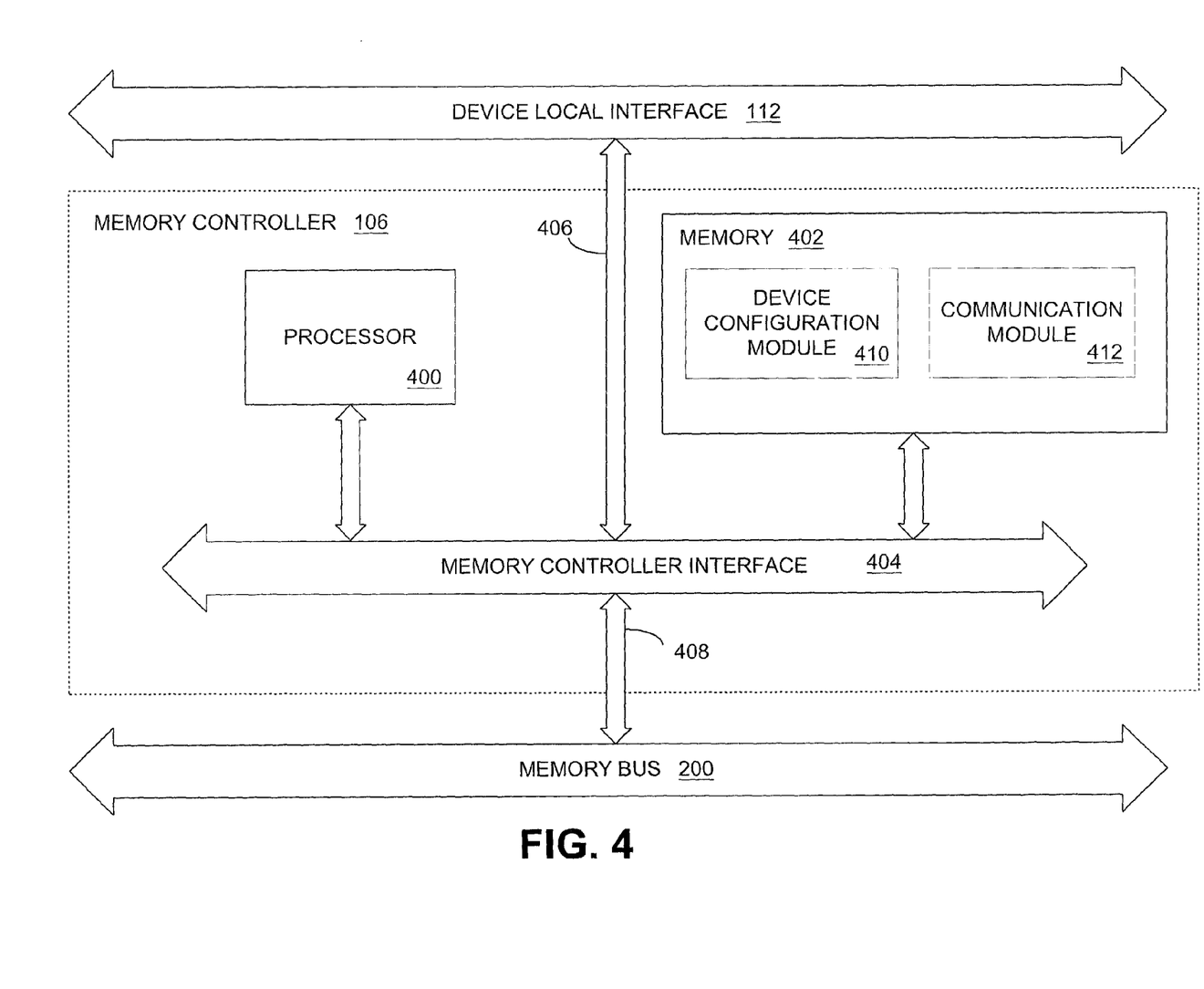
FIG. 4 is a schematic diagram illustrating one possible embodiment of the memory controller of FIG. 2.

FIG. 4 is a schematic diagram illustrating one possible embodiment of memory controller 106 of FIG. 2. Memory controller 106 may comprise a processing device 400 and memory 402 interconnected via a memory controller interface 404. Memory controller interface 404 may be in communication with memory bus 200 via connection 408. When implemented in computing device 100, memory controller interface 404 communicates with device local interface 112 via connection 406. Memory 402 may comprise a device configuration module 410 adapted to configure each of the plurality of nonvolatile memory devices 108 with a unique device identifier. Memory 404 may further comprise a communication module 412 configured to manage communications with the plurality of nonvolatile memory devices 108 based on the unique device identifiers. One of ordinary skill in the art will appreciate that communication module 412 may be configured to implement any type of communication protocol. In one embodiment, communication module 412 is configured to implement a packet-based communication protocol in which messages are exchanged between memory controller 106 and nonvolatile memory devices 108 using the unique device identifiers established during the device configuration process.

Memory 402 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 402 may incorporate electronic, magnetic, optical, and/or other types of storage media. Memory 402 may also have a distributed architecture, where various components are situated remote from one another, but may be accessed by the processing device 400.

Processing device 400 may be a hardware device for executing software located in memory 402. Processing device 400 may be any custom made or commercially available processor, a central processing unit (CPU), a semiconductor based microprocessor (in the form of a microchip or chip set), a macroprocessor, or generally any device for executing software instructions.

One of ordinary skill in the art will appreciate that device configuration module 410 and communication module 412 may be implemented in hardware, software, firmware, or a combination thereof. As illustrated in FIG. 4, in one of a number of possible embodiments, device configuration module 410 and communication module 412 may be implemented in software or firmware that is stored in memory 402 and executed by processing device 400 or any other suitable instruction execution system. If implemented in hardware, as in alternative embodiments, device configuration module 410 and communication module 412 may be implemented with any or a combination of the following technologies: a state machine, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), a programmable logic device (PLD), etc.

Figure 5:
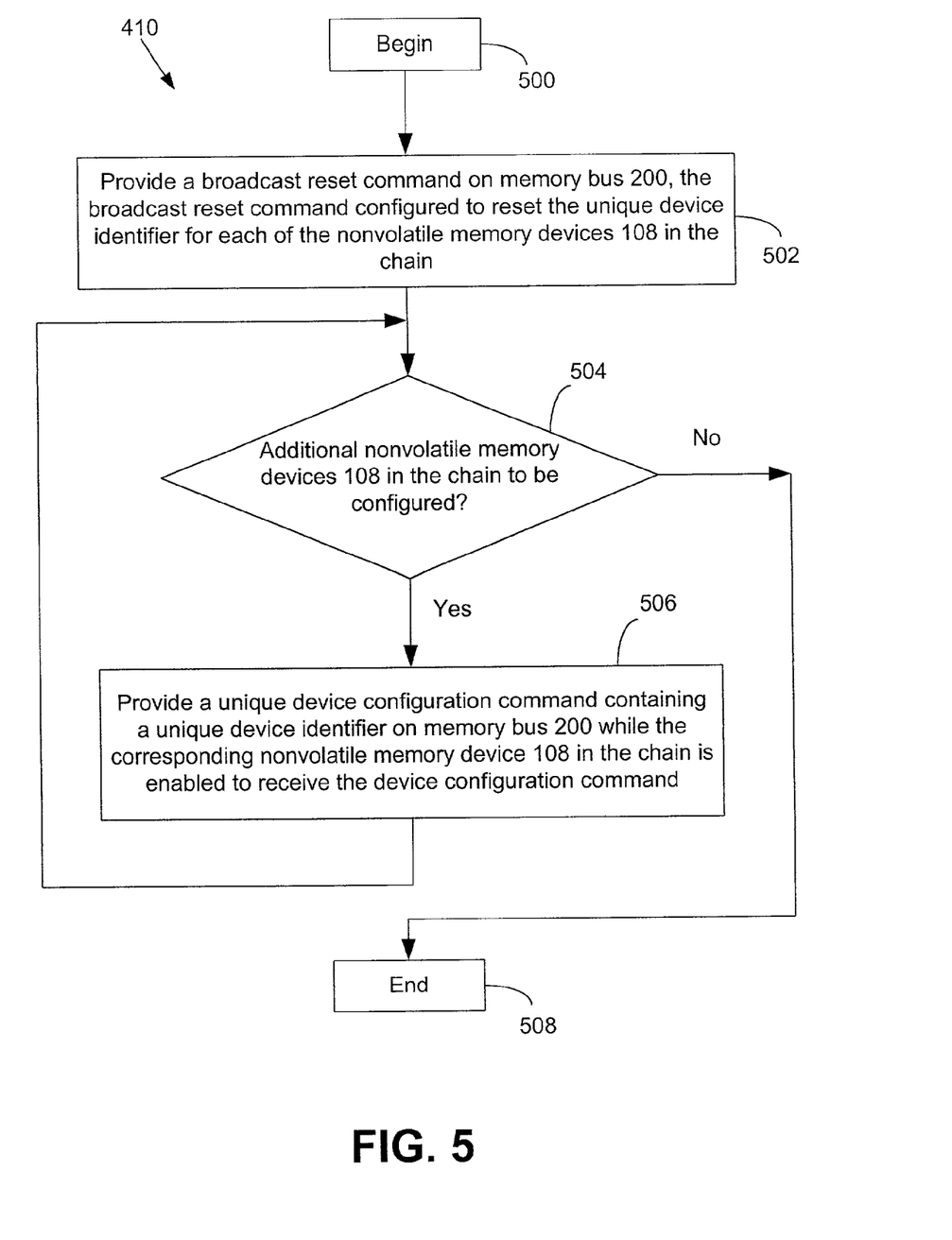
FIG. 5 is a flowchart illustrating the architecture, operation, and/or functionality of an embodiment of the device configuration module of FIG. 4.

FIG. 5 is a flowchart illustrating the architecture, operation, and/or functionality of one of a number of possible embodiments of device configuration module 410 (FIG. 4) for configuring the plurality of nonvolatile memory devices 108 with a unique device identifier via memory bus 200. After beginning at block 500, at block 502, device configuration module 410 provides a broadcast reset command via memory bus 200. As stated above, the broadcast reset command may be configured so that it is received by each nonvolatile memory device 108. Furthermore, when the reset command is received by each nonvolatile memory device 108, the corresponding unique device identifier stored in memory may be reset.

At decision block 504, device configuration module 410 determines whether there are additional nonvolatile memory devices 108 in the chain to be configured with a unique device identifier. As described above with respect to the operation of system 120, there are a number of ways for the memory controller to determine if there are additional nonvolatile memory devices in the chain. Therefore, device configuration module 410 may determine that the last nonvolatile memory device has been configured when the enable configuration command (or any other command) is received from the last nonvolatile memory device on the configuration done input. In alternative embodiments, the device configuration module 410 may be adapted to configure a predetermined maximum number of nonvolatile memory devices. For instance, in operation, the device configuration module 410 may cycle through the configuration process the predefined maximum number of times regardless the number of nonvolatile memory devices in system 120. Device configuration module 410 may then verify how many nonvolatile memory devices are actually in system 120 by sending a message on memory bus 200 for each unique device identifier. Each nonvolatile memory device in system 120 may then send an acknowledgement message that may be received by device configuration module 410. In this manner, device configuration module 410 may determine which unique device identifiers are active.

If there are additional nonvolatile memory devices 108 to configure, at block 506, device configuration module 410 provides a unique device configuration command containing a unique device identifier on memory bus 200 while the corresponding nonvolatile memory device 108 in the chain is enabled to receive the device configuration command as described above. As shown in decision block 504, if there are additional nonvolatile memory devices 108 in the chain, the process is repeated for the next nonvolatile memory device 108 in the chain. If there are no additional nonvolatile memory devices 108 in the chain, the process terminates at block 508.

After nonvolatile memory devices 108 are configured with unique device identifiers, communication module 412 may be implemented by processor 400 to manage communications with the plurality of nonvolatile memory devices 108 based on the unique device identifiers. As stated above, communication module 412 may be configured to implement any type of communication protocol, and in one embodiment, communication module 412 is configured to implement a packet-based communication protocol in which messages are exchanged between memory controller 106 and nonvolatile memory devices 108 using the unique device identifiers established during the device configuration process.

IV. Nonvolatile Memory Device

Figure 6:
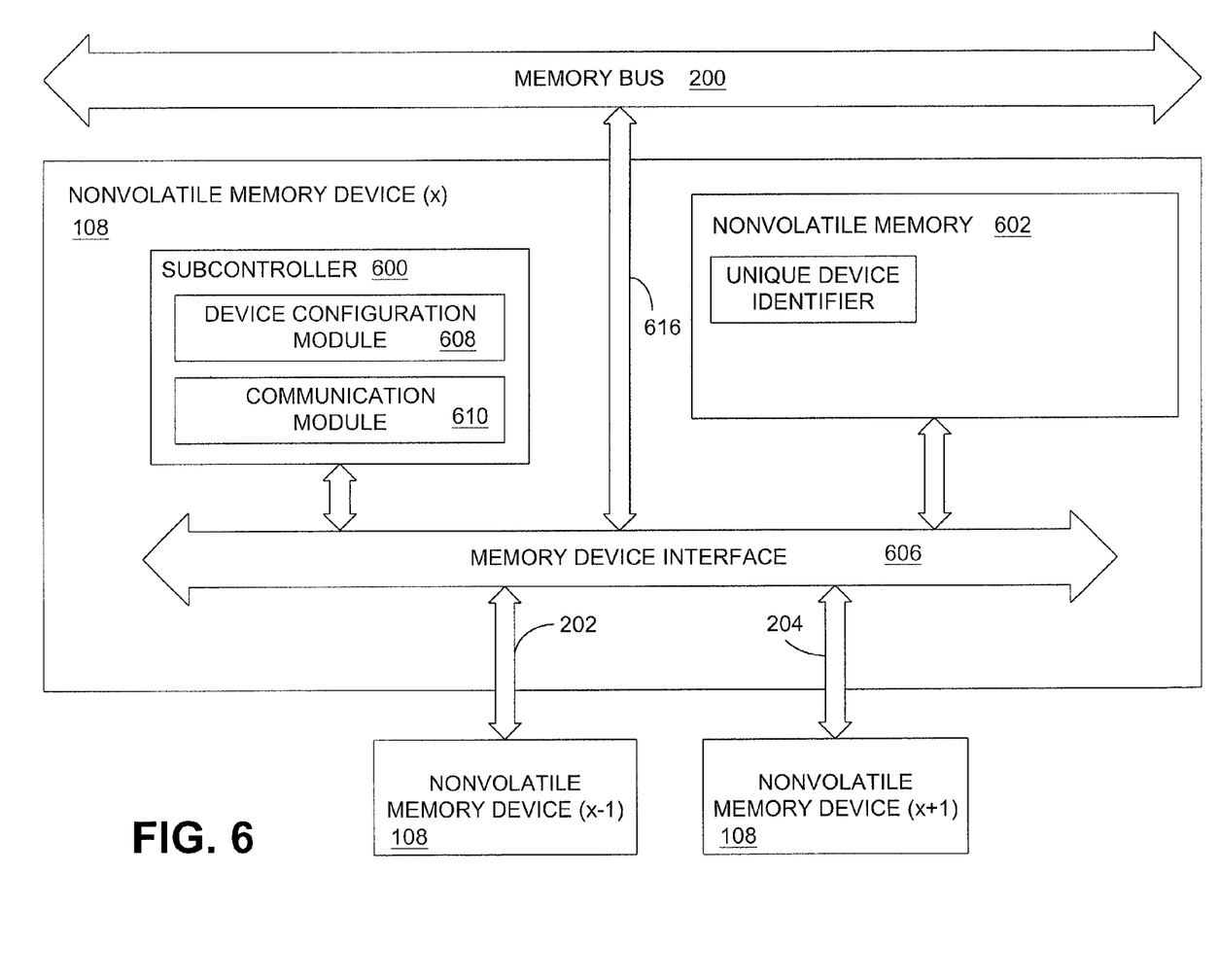
FIG. 6 is a schematic diagram illustrating one possible embodiment of one of the nonvolatile memory devices of FIG. 2.

FIG. 6 is a schematic diagram illustrating one possible embodiment of one of the nonvolatile memory devices 108 (FIG. 2) according to the present invention. As stated above, nonvolatile memory device 108 may comprise any form of nonvolatile memory 602, including, but not limited to, floating gate solid-state nonvolatile memory, such as, flash memory, programmable read-only memory, erasable programmable read-only memory, or electrically erasable programmable read-only memory, non-rotating magnetic nonvolatile memory, and non-rotating optical (phase change) nonvolatile memory, to name a few. Nonvolatile memory device 108 may further comprise a subcontroller 600 integrated with nonvolatile memory 602 via memory device interface 606. Nonvolatile memory 602 may include a predefined portion for storing the corresponding unique identifier 620 provided during the configuration process. Subcontroller 600 comprises a device configuration module 608 adapted to configure the nonvolatile memory device 108 with the corresponding unique device identifier. Subcontroller 600 may further comprise a communication module 610 configured to manage communications between the nonvolatile memory device 108 and a memory controller 106 via memory bus 200 based on the unique device identifier 620. Communication module 610 may be configured in much the same way as communication module 412 (FIG. 4) described above.

As stated above, nonvolatile memory device 108 may further comprise an input connection 202 configured to receive an enable configuration command and an output connection 204 configured to provide an enable configuration command. When implemented in system 120, nonvolatile memory devices 108 are linked together using input connections 202 and output connections 204. As illustrated in FIG. 6, input connection 202 may be in communication with the previous nonvolatile memory device 108 in the chain and output connection 204 may be in communication with the next memory device in the chain.

One of ordinary skill in the art will appreciate that subcontroller 600, device configuration module 608, and communication module 610 may be implemented in hardware, software, firmware, or a combination thereof. As illustrated in FIG. 6, in one of a number of possible embodiments, subcontroller 600, device configuration module 608, and communication module 610 may be implemented in hardware with any or a combination of the following technologies: a state machine, a discrete logic circuit(s) having logic gates for implementing logic functions upon data signals, an application specific integrated circuit (ASIC) having appropriate combinational logic gates, a gate array(s), such as a field programmable gate array (FPGA), a programmable logic device (PLD), etc. In other embodiments, device configuration module 608, and communication module 610 may be implemented in software or firmware that is stored in memory and executed by a processing device or any other suitable instruction execution system.

Figure 7:
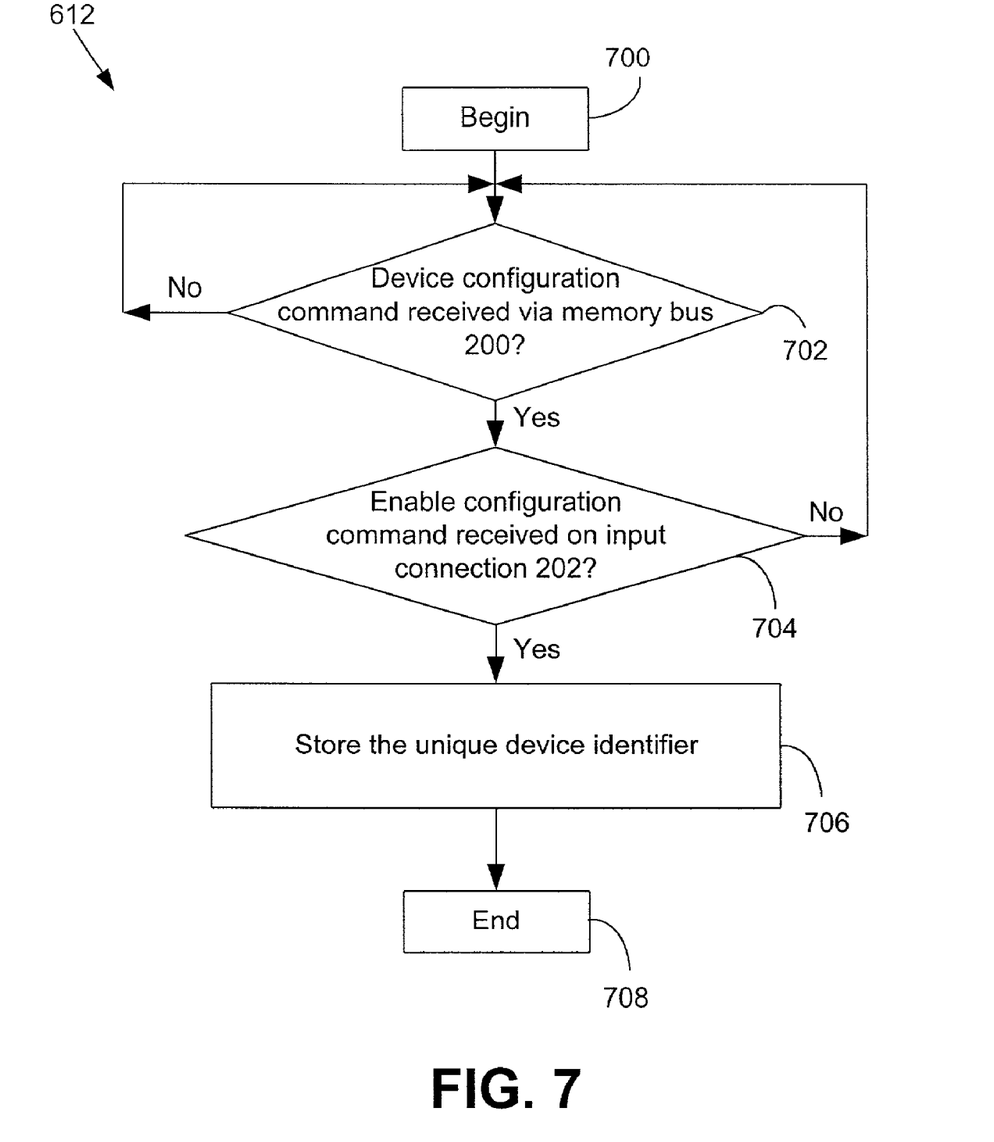
FIG. 7 is a flowchart illustrating the architecture, operation, and/or functionality of an embodiment of the device configuration module of FIG. 6.

FIG. 7 is a flowchart illustrating the architecture, operation, and/or functionality of an embodiment of device configuration module 608 according to the present invention for configuring nonvolatile memory device 108 with a unique device identifier via memory bus 200. After beginning at block 700, at block 702, device configuration module 608 determines whether a device configuration command has been received via memory bus 200. If a device configuration command is received via memory bus 200, device configuration module 608 determines whether an enable configuration command has been received on input connection 202. If an enable configuration command is received on input connection 202, device configuration module 608 stores the unique device identifier associated with the device configuration command in memory portion 620. Device configuration module 608 may be further configured to receive the broadcast reset command via memory bus 200 as described above. If the broadcast reset command is received, device configuration module 608 may reset the unique device identifier 620.

Device configuration modules 410 and 608 and communication modules 412 and 610, which each comprise an ordered listing of executable instructions for implementing logical functions, may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical), a state-machine, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), programmable logic device (PLD), etc.

Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Therefore, having thus described the invention, at least the following is claimed:

1. A system for controlling communication with nonvolatile memory devices via a memory bus, the system comprising:
    a memory controller, a first nonvolatile memory device and a second nonvolatile memory device, each of which being operative to communicate with the memory bus;
    wherein the memory controller is configured to control communication with the first and second nonvolatile memory devices by configuring each of the first and second nonvolatile memory devices, via the memory bus, with a unique device identifier such that, responsive to the first nonvolatile memory device determining that the first nonvolatile memory device is configured with a first unique device identifier from the memory controller, the first nonvolatile memory device forwards a subsequently received unique device identifier from the memory controller to the second nonvolatile memory device.

2. The system of claim 1, wherein the memory controller is further configured to provide a broadcast reset command to the first and second nonvolatile memory devices via the memory bus, the broadcast reset command configured to reset the unique device identifier associated with the first and second nonvolatile memory devices.

3. The system of claim 1, wherein the memory controller is further configured to provide a device configuration command containing the corresponding unique device identifier to the memory bus while the corresponding nonvolatile memory device is enabled to receive the device configuration command.

4. The system of claim 1, wherein the memory controller is further configured to exchange data messages, via the memory bus, with the first and second nonvolatile memory devices using a predefined packet-based communication protocol based on the unique device identifiers.

5. The system of claim 1, wherein the memory controller comprises:
    an interface adapted for communication with the memory bus; and
    logic configured to control communication with the first and second nonvolatile memory devices by configuring each of the first and second nonvolatile memory devices, via the memory bus, with a unique identifier.

6. The system of claim 5, wherein the logic comprises software and further comprising a processor configured to implement the software.

7. The system of claim 1, wherein the memory controller comprises:
    a means for communicating with the memory bus; and
    a means for configuring each of the first and second nonvolatile memory devices, via the memory bus, with a unique identifier.

8. The system of claim 7, wherein the means for configuring comprises a means for providing a device configuration command containing the corresponding unique device identifier to the memory bus while the corresponding nonvolatile memory device is enabled to receive the device configuration command.

9. The system of claim 8, wherein the memory controller further comprises a means for exchanging data messages, via the memory bus, with the first and second nonvolatile memory devices using a packet-based protocol means based on the unique device identifiers.

10. The system of claim 1, further comprising a user application stored in a memory and a processor in communication with the memory controller and configured to implement the user application and control the memory controller.

11. The system of claim 1, further comprising an input/output device.

12. A system for controlling communication with nonvolatile memory devices via a memory bus, the system comprising:
    a memory controller in communication with the memory bus, the memory controller configured to control communication with at least one nonvolatile memory device by configuring the at least one nonvolatile memory device, via the memory bus, with a unique device identifier;
    a memory bus; and
    a first nonvolatile memory device and a second nonvolatile memory device, both of which are in communication with the memory bus;
    wherein, the first nonvolatile memory device forwards a subsequently-received unique device identifier from the memory controller to the second nonvolatile memory device responsive to the first nonvolatile memory device determining that the first nonvolatile memory device has been configured with another unique device identifier.

13. The system of claim 12, wherein the first nonvolatile memory device comprises:
    an interface adapted to receive a device configuration command containing a unique device identifier via the memory bus;
    an input connection adapted to receive an enable configuration command; and
    an output connection adapted to provide an enable configuration command;
    wherein the memory controller is adapted to configure the first nonvolatile memory device with a unique device identifier by providing the device configuration command to the memory bus while the input connection of the first nonvolatile memory device is enabled to receive the device configuration command.

14. The system of claim 13, wherein the second nonvolatile memory device has an input connection, the output connection of the first nonvolatile memory device being connected to the input connection of the second nonvolatile memory device.

15. The system of claim 14, wherein the first nonvolatile memory device is further configured to provide the enable configuration command on the output connection to the input connection of the second nonvolatile memory device after the unique device identifier is stored.

16. The system of claim 12, wherein the first nonvolatile memory device is configured to receive the device configuration command containing the unique device identifier via the memory bus, determine when the input connection receives the enable configuration command, and, when the input connection receives an enable configuration command, store the unique device identifier.

17. The system of claim 12, wherein the memory controller and the first nonvolatile memory device are configured to exchange data messages, via the memory bus, using the unique device identifier.

18. A nonvolatile memory device adapted for communication with a memory controller via a memory bus, the nonvolatile memory device comprising:
   a local interface configured for communication with the memory bus;
   an input connection in communication with the local interface, the input connection configured to receive an enable configuration command; and
   logic configured to:
      receive a device configuration command containing a first unique device identifier via the memory bus;
      determine when the input connection receives an enable configuration command;
      responsive to the input connection receiving the enable configuration command, store the first unique device identifier;
      receive a second unique device identifier via the memory bus; and
      responsive to determining that the first unique identifier has been stored, communicate the second unique identifier to another nonvolatile memory device communicating with the memory bus.

19. The nonvolatile memory device of claim 18, further comprising an output connection in communication with the local interface and wherein the logic is further configured to provide an enable configuration command on the output connection after the unique device identifier is stored.

20. The nonvolatile memory device of claim 18, wherein the logic is software and further comprising a processor configured to implement the software.

21. The nonvolatile memory device of claim 18, wherein the logic is further configured to receive a broadcast reset command via the memory bus, the broadcast reset command configured to reset the first unique device identifier.

22. The nonvolatile memory device of claim 18, wherein the logic is further configured to exchange data messages, via the memory bus, with the memory controller using a predefined packet-based communication protocol based on the first unique device identifier.

* * * * *